INVENTOR.
WILLIS M. REES
RICHARD F. SHANNON
BY
ATTORNEYS

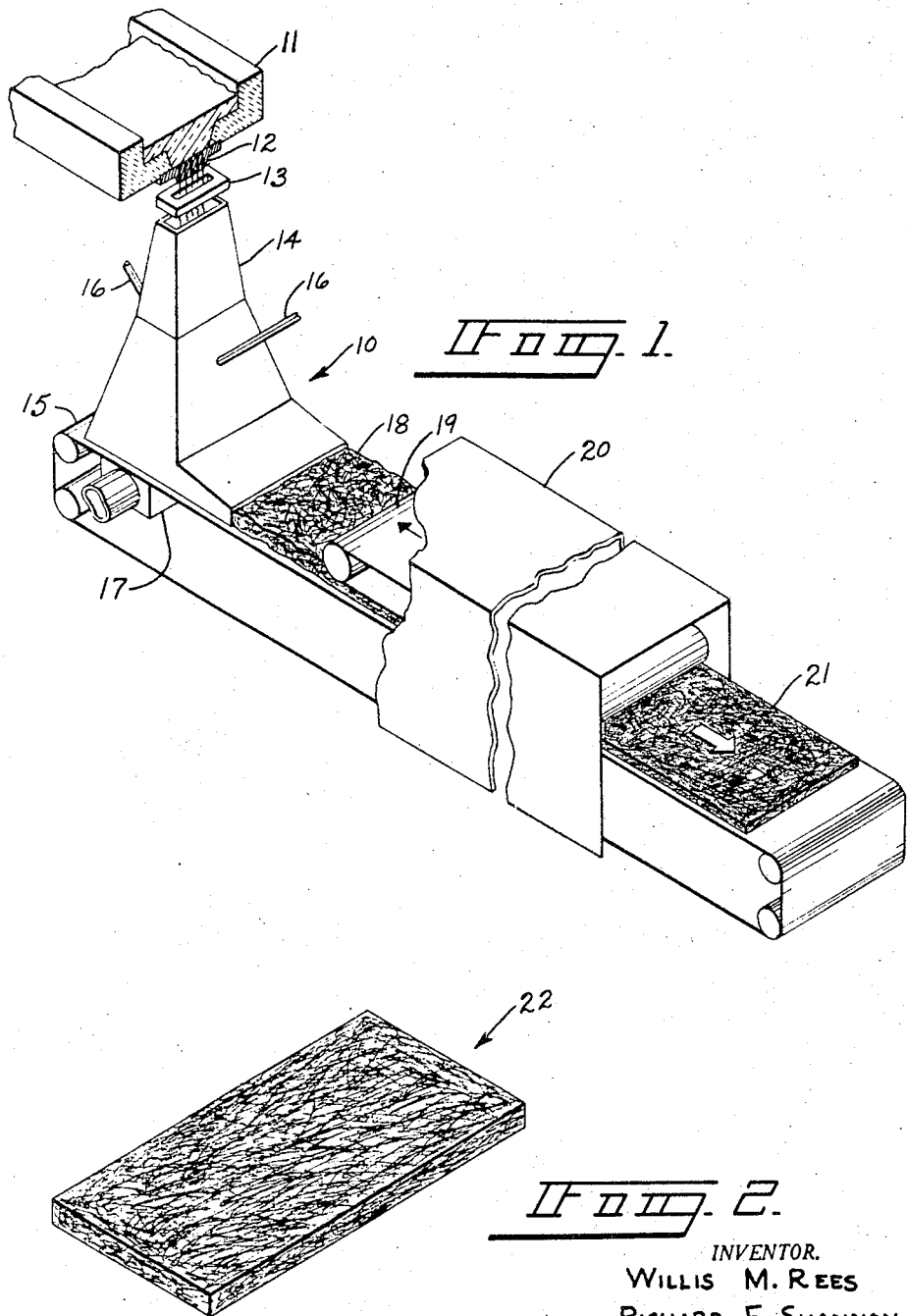

United States Patent Office

3,348,994
Patented Oct. 24, 1967

3,348,994
HIGH TEMPERATURE FIBROUS BOARD
Willis M. Rees, Newark, and Richard F. Shannon, Lancaster, Ohio, assignors to Owens-Corning Fiberglas Corporation, a corporation of Delaware
Filed Sept. 26, 1963, Ser. No. 311,805
16 Claims. (Cl. 161—170)

ABSTRACT OF THE DISCLOSURE

A fibrous board product composed of a mass of intermeshed glass or other vitreous fibers which are bonded together at points of contact by a resinous binder composition containing a fibrous calcium or magnesium silicate devitrifying agent and a devitrification accelerator selected from the oxides, hydroxides, carbonates or silicates of titanium, zirconium, chromium, aluminum and magnesium.

This inventtion relates to a fibrous board structure, and, more particularly, to such a structure comprising glass or other vitreous fibers disposed in an open, non-woven, intermeshed arrangement and bonded together at points of contact by a suitable binder composition to provide the rigidity characteristic of a board, and an associated material which is effective to increase the resistance of the board to elevated temperatures by comparison with previously known boards of the indicated type.

Various fibrous board products have heretofore been suggested, and have had relatively widespread acceptance in the acoustical and thermal insulation fields, e.g. as acoustical ceiling tiles, roof deck and formed insulation for pipes and the like. Such materials, in general, have fallen into one of two general categories, depending upon the method employed in the production thereof. One such method has involved the drawing of streams of molten glass through small orifices in the bottom of a glass melting tank, the rapid acceleration of the streams to cause attenuation thereof into fibers of a desired diameter and projection of the fibers onto a foraminous conveyor, association of a suitable binder composition with the fibers as they are being projected toward the conveyor, and curing of the binder while associated with the fibers which are collected as an open, non-woven, intermeshed mass, and while the mass is compressed to provide a required apparent density in the ultimate product (such method is hereinafter referred to as the "glass fiber board process"). The second general method for producing such boards has involved a wet process, wherein fibers, e.g., cellulosic fibers or vitreous fibers formed from glass, minerals or slags, and a suitable binder or binder composition are formed into a slurry with water, and fibers and associated binder are deposited on a continuously advancing screen; water and some of the binder flow through the screen which subsequently carries the deposited fibers and binder through a drying oven (such process is hereinafter referred to as the "wet method").

Substantial differences exist between the fibrous board materials produced by the glass fiber board process and by the wet method. Boards produced by the glass fiber method comprise intermeshed fibers in an open, nonwoven arrangement, but with major void regions uniformly distributed throughout, and with the binder collected almost entirely as a coating on the fiber surfaces. The binder in boards produced by the wet method substantially completely fills the voids among the fibers, so that the final product is substantially impervious to gases and liquids. As a consequence of their substantially impervious nature, boards produced by the wet method are not acoustical materials per se, although acoustic materials have been made therefrom by providing suitable perforations extending substantially completely through the thickness thereof. Boards produced by the glass fiber board process, because of the uniformly distributed voids therein, are acoustic materials, as produced, and without the necessity for perforations. Boards produced by the wet method from vitreous mineral or slag fibers are of higher apparent density than are boards made by the glass fiber board process, and the fibers in the former are short and less uniform in diameter by comparison with fibers in the latter. Boards of low apparent density made by the wet method usually have cellulosic or other low density and water sensitive fibers therein.

Various synthetic resinous binder systems, e.g. based upon phenolic resoles, are suitable for use in producing boards by the glass fiber board process. Such binder systems, when cured or otherwise converted to a hardened condition, are dimensionally stable under variations in humidity which are encountered in all known uses to which such boards are put. Since the fibers themselves are similarly stable, dimensional change as a consequence of variations in humidity is not a problem with such boards. Binder compositions suitable for use in producing such boards by the wet process are generally water sensitive, and the boards frequently include water sensitive cellulose fibers, starch, or both. As a consequence, such boards are subject to substantial dimensional changes with variations in humidity, and care must be taken, for example, to avoid their installation prior to a time when either unusually high or unusually low humidity conditions which may prevail during the construction of a building have terminated.

Previously known fibrous board materials produced by the glass fiber board process have been comparatively lacking in resistance to elevated temperatures. For example, when a small sample of such a board that is presently available commercially is placed in an oven at 1500° F., the binder composition which locks the fibers thereof to one another in their randomly intermeshed arrangement is rather rapidly burned, and, after a period of about thirty minutes, the fibers themselves fuse together to such an extent that only a blackened glob of glass remains. The glob has generally the configuration of the original sample, but each lineal dimension has shrunk to somewhere near half of the corresponding lineal dimension in the original sample. If such a sample is placed in an oven at about 1800° F., only a glass glob remains after approximately ten minutes, and the glob has a configuration which depends solely upon that of the substrate upon which it formed within the oven, and no necessary recognizable relationship to the configuration of the original sample. Other such boards that are presently available are even less resistant to elevated temperatures.

The instant invention is based upon the discovery that board products made by the glass fiber method can be upgraded substantially relative to temperature resistance by various interrelated treatments. In a specific instance, finely divided asbestine is used in the binder composition for the glass fiber board process for producing the board; in a second specific instance both asbestine and titania are used in this binder composition; and in a third instance the board produced by the glass fiber board process is post-impregnated with a suitable clay, and, preferably, asbestine or asbestine and titania are used in the binder. It has been found that the asbestine causes the glass fibers in the board to devitrify as the board is heated even rather rapidly to elevated temperatures, e.g. higher than about 1000° F. As a consequence of the devitrification, the fibers are more resistant to the elevated temperatures. When a board produced by the glass fiber board process using both asbestine and titania as binder constituents is subjected to temperatures higher than about 1000° F., devitrification occurs as indicated above, and the fibers are more viscous [1] at the elevated temperatures, so that their tendency to flow is further reduced. A suitable clay impregnant in a fibrous board produced by the glass fiber board process acts as a high temperature binder for the fibers which is effective after the phenolic or other synthetic resinous binder has been consumed, or at least made relatively ineffective by subjection to elevated temperatures, and, therefore, supplements the asbestine or asbestine and titania for applications where service temperatures in excess of about 1000° F. must be anticipated. However, phenolic and other synthetic resinous binders become ineffective at temperatures considerably below 1000° F., and clay when associated with phenolic and certain other organic binder materials, is an effective binder when subjected to temperatures considerably therebelow. Accordingly, clay impregnated fibrous board material made by the glass fiber board process constitutes a substantial advance in the art even relative to structures where neither asbestine nor titania is used as a binder constituent.

It is, therefore, an object of the invention to provide a fibrous board product made by the glass fiber board process which has substantially improved resistance to elevated temperature service conditions by comparison with previously known fibrous board materials of the indicated type.

It is a further object of the invention to provide an improved fibrous board material of the indicated type wherein individual fibers are bonded to one another at points of contact and are in surface contact with asbestine or an equivalent therefor.

It is still another object of the invention to provide an improved fibrous board material of the indicated type wherein individual fibers are bonded to one another at points of contact and are in surface contact with asbestine or an equivalent and titania or an equivalent.

It is yet another object of the invention to provide an improved fibrous board material of the indicated type wherein individual fibers are bonded to one another at points of contact and are in surface contact with asbestine or an equivalent and titania or an equivalent, and which board product has finely divided clay particles distributed through interstices among the fibers.

It is still a further object of the invention to provide a fibrous board product of the indicated type wherein finely divided clay particles are distributed throughout interstices among the fibers.

Other objects and advantages will be apparent from the description which follows, reference being made to the accompanying drawings, in which:

FIG. 1 is a partially schematic perspective view illustrating the glass fiber board process for producing a fibrous board product.

FIG. 2 is a view in perspective showing a typical fibrous board product which can be made by the method of FIG. 1.

Figure 3:
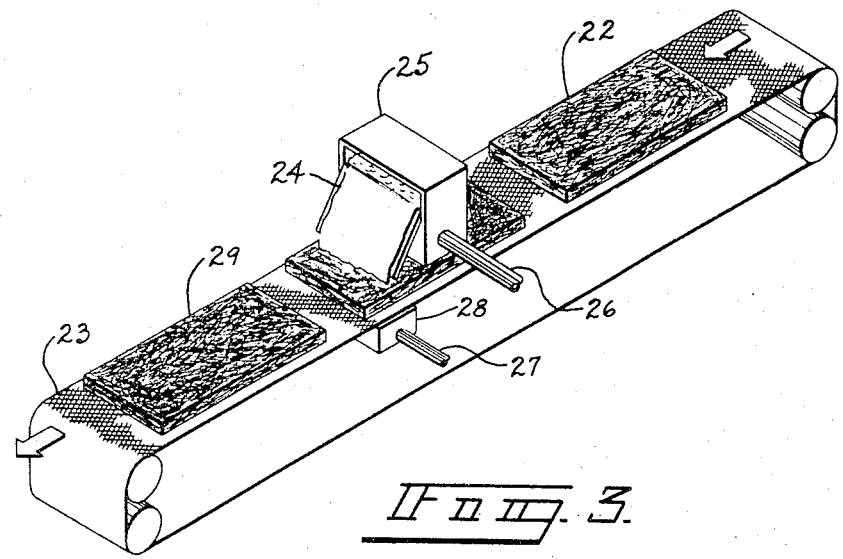
FIG. 3 is a partially schematic perspective view illustrating the first step in a method according to the invention for impregnating such a board product as that shown in FIG. 2 with a slurry which includes a clay and an organic binder.

A fibrous board product having improved resistance to elevated temperatures is provided in accordance with the invention. Such product comprises a mass of intermeshed glass or other vitreous fibers bonded to one another at points of contact by a hardened synthetic resinous binder material and where the fibers are in surface contact with a devitrifying agent for the glass of which the fibers are composed. It is preferred that the binder is present as a coating covering at least about 40% of the surfaces of the fibers. Effective devitrifying agents include glass forming cations, usually aluminum, magnesium or an alkaline earth metal in a chemically combined form, for example, the silicate, the oxide, or a salt which is converted to the oxide upon heating, silica, and other materials which remain solid, at least in part, at the temperatures at which devitrification of the glass fibers occurs. Optimum results have been achieved using, as devitrifying agents, silica and mixed silicates of alkaline earth metals or of magnesium and alkaline earth metals. Asbestine, wollastonite, silica, various types of asbestos, and talc are all examples of devitrifying agents that can be used in accordance with the invention.

The particle size of the devitrifying agent, as well as its chemical identity, is important. Specifically, the devitrifying agent must be substantially completely finer than 200 mesh, U.S. Sieve Series, and, preferably, is substantially completely finer than 325 mesh, U.S. Sieve Series. For optimum results, in addition, at least 50 percent [2] of the divitrifying agent should have a particle size finer than 20 microns, and, ideally, at least 50 percent thereof should have a particle size less than 10 microns.

It has been determined that the mechanism by which devitrifying materials are effective in accordance with the invention is one which may be denominated "nucleation." Glass can properly be characterized as a super-cooled liquid. This is an abbreviated way of saying that the familiar forms of glass are produced by cooling from a vitreous liquid condition at a rate sufficiently high to prevent devitrification or crystallization which would occur upon slow cooling. For any given glass composition there is some maximum temperature, usually called the maximum devitrification temperature, above which devitrification does not occur. At all lower temperatures, the glass has a tendency to devitrify. The molecular mobility of any glass is a direct function of temperature. A certain degree of molecular mobility is necessary to enable crystallization or devitrification of a glass at temperatures below the maximum devitrification temperature. Accordingly, at comparatively low temperatures, below what may be denominated the minimum temperature at which devitrification occurs, the molecular mobility of a glass is sufficiently low that it does not undergo crystallization. At temperatures intermediate the minimum temperature at which devitrification occurs and the maximum devitrification temperature, glass will devitrify, and, in general, at a rate which depends, among many other things, upon temperature, the rate being a direct function of temperature.

Asbestine and equivalents therefor are effective, in accordance with the instance invention, because they provide nuclei on the glass fiber surfaces, and these nuclei greatly accelerate the rate at which devitrification occurs, particularly at temperatures only slightly above the minimum temperature at which devitrification occurs. The phenomenon can be likened to the crystallization which occurs when a crystal of a given salt is added to a super-cooled solution of that salt. The devitrifying agents which have previously been mentioned are peculiarly effective because of their chemical similarity to glasses. However, other nucleating agents can be used in a similar manner, including finely divided metal powders which are solids at the temperatures at which devitrification occurs, e.g., gold, silver, platinum, rhodium, iridium, tin and the like.

---

[1] When board products made by the glass fiber board process, and having only asbestine added to the binder are subjected to such elevated temperatures, for example when supported only along their edges and in a horizontal position, the products fall or sag in a manner which resembles plastic flow of a viscous liquid. Titania makes the fibers more viscous in the sense of reducing the rate of fall or sag, but the mechanism, as will subsequently be discussed in more detail, is one of increasing the rate of devitrification.

[2] The terms "percent" and "parts" are used herein and in the appended claims to refer to percent and parts by weight, unless otherwise indicated.

It will be appreciated that extremely fine particles of any devitrifying agent are more effective at causing nucleation than larger particles of the same devitrifying agent. In this connection, experimental work has demonstrated that silica having a maximum particle size of about 1 micron is significantly more effective at causing devitrification than the same amount of silica having an average particle size of about 5 microns. No lower limit has been found relative to particle size of a devitrifying agent, insofar as the nucleation phenomenon is concerned, with presently available materials. However, when a devitrifying agent is incorporated in a binder in producing glass fiber board products, the devitrifying agent must not be so finely divided that the amount thereof employed causes undue thickening of the binder system. There is, therefore, a practical lower limit on particle size of a devitrifying agent that is applied to glass fibers while mixed with a binder composition therefor. As will subsequently be discussed in more detail, it is possible to apply devitrifying in a different manner; when they are applied in the different manner, and not as binder constituents, there is no known lower limit on particle size, and, in fact, particles finer than 1 micron are more effective than the same quantity of coarser particles. Since the mechanism of devitrification requires surface contact between the glass and the devitrifying agent, finely divided fibrous materials are more effective, other factors being equal, than non-fibrous materials.

In a preferred embodiment, the fibrous board product according to the invention has, dispersed in the binder, in addition to the devitrifying agent for the fibers, a material which is effective, upon softening of the fibers, to increase the apparent viscosity thereof by increasing the rate of devitrification. Finely divided titania is the best presently known material for this purpose, but significant improvements can be achieved with other oxides of titanium in finely divided form, with finely divided oxides, hydroxides, carbonates, or silicates of zirconium, chromium, iron, or with combinations of two or more of the indicated materials. These and other devitrification accelerators are effective, in general, by either of two mechanisms or by a combination of the two: (a) by lowering the softening temperature of the glass, (b) by disproportionately raising the maximum devitrification temperature relative to the minimum temperature at which devitrification occurs, or by a combination of the two, and, in any case, relative only to surface portions of the glass fibers. Devitrification accelerators may also act as nucleating agents to a certain degree, and nucleating agents may lower the softening temperature or disproportionately raise the maximum devitrification temperature, at least to some extent. It will be apparent from the foregoing discussion of the devitrification of glass that the magnitude of the tendency toward devitrification, at any given temperature, is a direct function of the degree of mobility of the molecules of the glass at that temperature, and is also a direct function of the temperature difference between the maximum devitrification temperature for the glass and that temperature. Titania, for example, is a flux for glass fibers having the compositions contemplated by this invention. When such fibers are heated, with minute particles of $TiO_2$ on their surfaces, limited solid phase diffusion of $TiO_2$ into the glass occurs, lowering the softening point of the portions of the glass where diffusion increases the titania content, and correspondingly increasing the molecular mobility of the glass at any given temperature. As a consequence of the increased molecular mobility, the rate at which devitrification is caused by asbestine or another nucleating agent is increased, and the time prior to substantially complete devitrification of the fibers during which the phenomenon resembling plastic flow can occur is minimized. A similar phenomenon occurs when calcium oxide, for example, is used as a devitrification accelerator, but for a different reason. The principal result of diffusion of calcium oxide into surface portions of the fibers is to increase the maximum devitrification temperature relative to the minimum temperature at which devitrification occurs. As a consequence of this increase, the glass itself has an increased tendency toward devitrification at any given temperature, and this increases the rate at which devitrification is caused by asbestine or another nucleating agent.

The devitrification accelerator, like the devitrifying agent, must be finely divided. Specifically, substantially all of the devitrification accelerator should be finer than 200 mesh, and, preferably, finer than 325 mesh, both U.S. Sieve Series. For optimum results, at least 50 percent thereof should be finer than 20 microns, and, ideally, at least 50 percent thereof should be finer than 10 microns. Also, as in the case of the devitrifying agent, even finer particle sizes are more effective at accelerating devitrification, the only known lower limit being imposed by the nature of the binder system when titania or the like is incorporated therein. When the devitrification accelerator is added independently of the binder system, as subsequently discussed in more detail, optimum results can be achieved with particles of a devitrification accelerator not coarser than about 1 micron.

In still another embodiment, the fibrous board material comprises, in addition to the glass or other vitreous fibers and a hardened binder composition bonding fibers to one another at points of contact, a high temperature binder-impregnant composition distributed throughout interstices among the fibers in the board material. The high temperature binder-impregnant composition must include a hardened resite or other organic, low temperature binder material, as subsequently discussed in more detail, and a high temperature binder constituent such as a finely divided clay. Specifically, the clay must be one substantially all of which is finer than 200 mesh, and, preferably, substantially all of which is finer than 325 mesh, both U.S. Sieve Series. For optimum results, at least 50 percent of the clay or other high temperature binder constituent should be finer than 20 microns in particle size, and, ideally, at least 50 percent thereof should be finer than 10 microns.

In general, when a clay or other high temperature bonding material is heated it first expands and then subsequently contracts or shrinks. This property can be measured by pressing a plurality of bodies from the high temperature binder material at 10 percent moisture, firing the several bodies to a plurality of temperatures, and determining percent of lineal expansion or contraction for each of the firing temperatures. To be suitable for use in accordance with the instant invention, the high temperature binder material must be one which expands upon firing to about Orton Cone 10 or lower, although shrinkage can occur upon firing above Orton Cone 10. Ideally, the expansion upon firing to any temperature up to which expansion occurs should be not greater than about 1 percent, and the maximum percent expansion plus the shrinkage upon firing to 1900° F. should be not greater than about 11.

Referring now in more detail to the drawings, and, in particular, to FIG. 1, apparatus indicated generally at 10 can be used for producing fibrous board material by the glass fiber board process. The apparatus 10 comprises a glass melting tank 11 with bushing tips 12 disposed in the bottom thereof and a steam blower 13. Streams of molten glass are drawn from the tank 11 through small orifices in the bushing tips 12 by downwardly projected blasts of steam from the blower 13. The blasts of steam cause rapid acceleration and attenuation of the streams of glass to a desired fiber diameter, and projection of the fibers downwardly through a hood 14 onto a foraminous conveyor 15. A suitable binder composition, as subsequently described in more detail, is supplied through pipes 16 to spray heads (not illustrated) within the hood 14 for association with the fibers therein and co-collection therewith on the conveyor 15. A suction box 17 draws fibers and associated binder onto the conveyor 15, so that a wool-like mass 18 of fibers and associated, un-cured binder is delivered by the conveyor 15 from the forming hood 14. The mass 18 is advanced under a compression member 19 which is driven at the same speed and in the same direction as the conveyor 15. The mass of fibers and associated binder is advanced, while compressed between the compression member 19 and the conveyor 15, into a curing oven 20 where the binder is converted to a hardened condition to bond fibers relative to one another at points of contact and to produce the fibrous board material which is designated 21. The edges of the board material 21 are trimmed in any suitable manner (not illustrated) and desired lengths thereof are cut from the board 21 in any suitable manner (not illustrated).

A typical board product is indicated generally at 22 in FIG. 2. It will be apparent from the foregoing description of the glass fiber board process that the board 22 comprises a mass of intermeshed glass fibers disposed in an open, non-woven arrangement, with substantial interstices or voids among the several fibers, and that the fibers are bonded to one another at points of contact by the binder composition. Such boards as broadly as thus far described are known to the art, and are commercially available. Apart from the step of compression during cure of the binder, details of the method for the production thereof are set forth in Slayter et al. Patent 2,206,058. Such boards can also be produced by other known methods which differ principally with respect to the fiber-forming part of the process. For example, a single relatively large diameter stream of molten glass can be drawn from a suitable tank into a rotating centrifuge basket with peripheral orifices therein through which the molten glass is projected principally by centrifugal force into a stream of gases which may or may not cause further attenuation of the fibers, and which carry the fibers onto a foraminous conveyor. As in the process described in connection with FIG. 1, a binder composition is associated with the fibers as they are being projected toward the conveyor. Similarly, the fibers can be produced by drawing streams of molten glass from a suitable melting tank, cooling the streams into rodlets, and introducing the rodlets into burners which can be, for example, of the type shown in Stalego Patent 2,489,243 to cause resoftening of the rodlets and projection thereof by a high velocity blast of flame and combustion products onto a foraminous conveyor. Again, as in the two processes described previously, the binder is associated with the fibers as they are being projected toward the conveyor.

In general, board products produced by the several methods that have been discussed above contain from about 2 to about 15 pounds of glass or other vitreous fibers per cubic foot, and have an ignition loss ranging from about 5 to about 15 percent, which is considered in the art as meaning from about 5 to about 15 percent of the total weight of the board is organic binder composition.

According to one aspect of the instant invention, the binder composition used in practicing the glass fiber method is modified by addition thereto of asbestine or an equivalent therefor, or of asbestine or an equivalent therefor and titania or an equivalent therefor, as discussed above. In actual practice, phenolic resole binder compositions are most frequently used in practicing the glass fiber method, but compositions including other synthetic resinous materials as the bonding ingredient are known, and can also be used if desired. Typical preferred phenolic binder constituents including asbestine and wollastonite are set forth in Table I, below:

TABLE I.—COMPOSITION IN PARTS, BASED UPON DRY SOLIDS

| Composition No. | Water | Phenolic Resin A [1] | Pinewood Pitch Extract [2] | Asbestine [2] | Wollastonite [2] |
|---|---|---|---|---|---|
| 1 | Q.s.[3] | 80 | 20 | 50 | |
| 2 | Q.s. | 80 | 20 | 100 | |
| 3 | Q.s. | 90 | 10 | 100 | |
| 4 | Q.s. | 80 | 20 | | 100 |
| 5 | Q.s. | 80 | 20 | | 50 |

[1] Phenolic Resin A was produced as subsequently described in more detail.
[2] Subsequently identified in more detail.
[3] Sufficient water was used to provide a workable viscosity and curing rate. The actual amount varied from time to time, depending upon processing conditions, but ranged from about 76 to about 82 percent of the binder composition, based upon the total weight of Phenolic Resin A, Pinewood Pitch Extract and water.

Each of the binder compositions identified in Table I was produced by adding the required amount of water to a mixing tank provided with a propeller-type agitator, beginning agitation, and then adding the other indicated ingredients in the order in which they are listed in Table I, reading from left to right, and continuing agitation for five minutes after the asbestine or wollastonite addition to assure substantial uniformity of the completed binder composition. Various silicones have also been added, as well as ammonium hydroxide, emulsified mineral oil and ammonium sulfate. These materials serve a previously known function and do not alter the operation of the asbestine or wollastonite.

Phenolic Resin A was produced by charging a reaction vessel with 80 parts of phenol, 123 parts of a 50 percent water solution of formaldehyde, 19.3 parts of water and 12 parts of barium hydrate $(Ba(OH)_2 \cdot 8H_2O)$, and heating the resulting charge for a total of seven hours during which time it was stirred by a propeller-type agitator. The charge first was heated to 110° F., and maintained at about such temperature for approximately two hours, and was then heated to and held at about 140° F. for the remaining five hours, at which time the refractive index of the reaction mixture was 1.4620 and the infra-red absorption analysis indicated that it was substantially free of unreacted phenol and also of methylene groups. The reaction products were then cooled to approximately 100° F., and neutralized with sulfuric acid to a pH of about 7.5. A 28 part charge of dicyandiamide was then added to the neutralized reaction products, and the resulting mixture was heated to and maintained at approximately 140° F. for an additional one hour period. The reaction products were then cooled to approximately room temperature of 75° F., and neutralized with further sulfuric acid to a pH of approximately 7.4.

The pinewood pitch extract used in the binder compositions identified in Table I, above, was resinous in nature. It can be isolated as described in U.S. Patent 2,391,368 (p. 2, col. 1, lines 34 and following). It had the following analysis:

6 percent high melting furfural condensate (methanol insoluble).

4 percent neutral oils (hydrocarbons, esters and ethers).
9 percent rosin.
5 percent belro-phenol-lactone (probably $$C_{18}H_{14}O_3.2(OCH_3OH))$$

5 percent flavone type polyphenol (possibly about $$C_{15}H_7O_2.3OH)$$

2 percent fumic acid type compound.
0.2 percent pectic acid type compound.
6 percent air oxidized resin acid (unfused).
3 percent strongly acidic compound.
38 percent weakly acidic, high melting phenolic compound.
19 percent relatively neutral phenol ethers and esters.
1 percent water soluble carbohydrates, etc.

The asbestine used in the binder composition set forth in Table I had a specific gravity at 20° F. of 2.78, and the following chemical analysis:

| Ingredient | Percent |
|---|---|
| $SiO_2$ | 58.61 |
| $MgO$ | 28.88 |
| $CaO$ | 4.97 |
| $Fe_2O_3$ | 0.30 |
| $Al_2O_3$ | 0.85 |
| $CO_2$ | 1.95 |
| Ignition loss | 4.41 | pH, 9.4.

It had a particle size distribution as indicated by the following table:

| Percent finer: | Relative diameter, in microns |
|---|---|
| About 98 | 30 |
| 70 | 10 |
| 46 | 5 |
| 29 | 3 |
| 18 | 1 |
| 7 | .5 |

The wollastonite used in the foregoing binder compositions contained about 51 percent of $SiO_2$, about 47 percent of $CaO$, and about 0.5 percent of $FeO$, ignition loss about 0.9. At least 99 percent thereof was finer than 325 mesh, U.S. Sieve Series, and the mean particle size was about 11 microns.

coloration after having been subjected to a temperature of 1800° F. for ten minutes in a furnace, and even less shrinkage after thirty minutes at 1500° F. The analysis of the specific fibers with which the foregoing tests were performed was as follows:

| Ingredient | Percent |
|---|---|
| $SiO_2$ | 55.83 |
| $CaO$ | 20.17 |
| $MgO$ | 6.98 |
| $Al_2O_3$ | 5.53 |
| $Na_2O$ | 10.55 |
| $K_2O$ | 0.27 |
| $MnO$ | 0.30 |
| $Fe_2O_3$ | 0.20 |
| $TiO_2$ | 0.17 |

In addition, binder composition No. 2, when used with the indicated glass, passed a standard Underwriters' Laboratory Test for a one hour fire rating. This test was conducted in a simulated room structure with a concrete slab at the top thereof, supported on steel joists, with a metal framework therebelow from which fibrous boards made as described were suspended approximately twelve inches below the undersurface of the concrete slab. Gas burners were disposed below the fibrous boards, and were fired to provide a predetermined temperature curve as measured by thermocouples disposed approximately one foot below the lower surfaces of the boards. This test and its results are described in Report R3583-2 of Underwriters' Laboratories, Inc., entitled "Acoustical Tile in a Floor and Ceiling Construction," Jan. 5, 1962.

Substantially equivalent results can be achieved using binder compositions identical with those set forth in Table I, above, except that an equal volume of talc, asbestos, silica, alumina, fibrous boehmite (AlOOH), Portland cement, gypsum or other devitrifying agents, in any case substantially all of which is finer than 200 mesh, U.S. Sieve Series, is substituted for the asbestine or wollastonite.

In a preferred embodiment, as has been indicated above, binder compositions for use in producing board products according to the invention include not only a devitrifying agent for the glass or other vitreous fibers, but, also, a material which is effective to accelerate devitrification. Examples of suitable binder compositions including both such materials are set forth in Table II, below:

TABLE II.—COMPOSITION IN PARTS, DRY SOLIDS BASIS

| Composition No. | Water | Phenolic Resin A [1] | Pinewood Pitch Extract [1] | Asbestine [1] | Wollastonite [1] | $TiO_2$ [2] | Zirconium Silicate [2] |
|---|---|---|---|---|---|---|---|
| 6 | Q.s. [3] | 61 | 39 | 100 | | 100 | |
| 7 | Q.s. | 80 | 20 | 80 | | 20 | |
| 8 | Q.s. | 80 | 20 | 80 | | 20 | |
| 9 | Q.s. | 80 | 20 | 90 | | 10 | |
| 10 | Q.s. | 80 | 20 | 40 | | 10 | |
| 11 | Q.s. | 80 | 20 | 80 | | | 20 |
| 12 | Q.s. | 80 | 20 | 90 | | | 10 |
| 13 | Q.s. | 80 | 20 | 40 | | | 10 |
| 14 | Q.s. | 80 | 20 | 80 | | 10 | 10 |
| 15 | Q.s. | 80 | 20 | 40 | | 5 | 5 |
| 16 | Q.s. | 80 | 20 | | 80 | 20 | |
| 17 | Q.s. | 80 | 20 | | 80 | 20 | |
| 18 | Q.s. | 80 | 20 | | 80 | | 20 |

[1] Previously identified.
[2] Subsequently identified in detail.
[3] Sufficient water was used to provide a workable viscosity and curing rate. The actual amount varied from time to time, depending upon processing conditions, but ranged from about 76 to about 82 percent of the binder composition, based upon the total weight of Phenolic Resin A, Pinewood Pitch Extract and water.

When the binder compositions described in Table I, above, were employed in the production of boards by the glass fiber process, as described above, and in such proportions as to provide a final product having an ignition loss from about 9 to about 14 percent, the final boards were found to be substantially more resistant to elevated temperatures than boards which were identical except that no asbestine was employed in the binder composition. For example, boards produced using the binder compositions set forth in Table I showed only slight shrinkage and dis- The $TiO_2$ actually used in the compositions identified in Table II was anatase, refractive index 2.55, specific gravity 3.9, about 98 percent $TiO_2$, 1 percent $Al_2O_3$, balance impurities, and an average particle mean diameter of about 0.3 micron.

The zirconium silicate used in the compositions of Table II had the following analysis: $ZrO_2$, 65.2; $SiO_2$, 34.3; $TiO_2$, 0.14; $Fe_2O_3$, 0.03; and $Al_2O_3$, 0.2. Its average particle size was 5 to 7 microns, and 99.8 percent thereof was finer than 325 mesh, U.S. Sieve Series.

Boards produced from Table II binder compositions had substantially more elevated temperature resistance than boards from Table I binders, as determined either by the previously described muffle tests or by a small scale simulation of the Underwriters' Laboratories Tests. Substantially greater elevated temperature resistance has also been achieved where an equal volume of another oxide of titanium, an oxide or hydroxide of zirconium, a carbonate, oxide or hydroxide of chromium, or a carbonate, oxide, hydroxide or silicate of iron and in any case substantially all of which was finer than 200 mesh, U.S. Sieve Series, was substituted for the $TiO_2$ or zirconium silicate of the compositions of Table II. Excellent results have also been achieved using a silica sol, specifically one having an average particle size of about 1 micron, and preferably added separate from the binder, as subsequently described.

Operable, preferred and optimum ranges of content of glass or other vitreous fibers, resin solids, asbestine or equivalent and $TiO_2$ or equivalent for fibrous board products according to the invention, and for acoustical uses, are set forth in Table III, below:

TABLE II

|  | Operable | Preferred | Optimum |
| --- | --- | --- | --- |
| Apparent density of vitreous fibers in fibrous board product in pounds per cubic foot. | 2 to 15 | 5 to 12 | 8 to 11. |
| Percent resin solids | 5 to 15 | 9 to 14 | 10 to 12. |
| Ratio of parts of resin solids to parts of asbestine or equivalent plus $TiO_2$ or equivalent.[1] | 2:3 to 3:2 | 3:4 to 5:4 | 4:5 to 6:5. |
| Ratio of parts of asbestine or equivalent to parts of $TiO_2$ or equivalent.[2] | 1:1 to 19:1 | 17:3 to 3:1 | 9:1 to 7:3. |

[1] When a devitrifying agent other than asbestine is used, it should equal in volume a weight of asbestine within the limits set forth.
[2] When a devitrification accelerator other than $TiO_2$ is used, it should equal in volume a weight of $TiO_2$ within the limits set forth.

According to still another embodiment of the invention, a fibrous board product comprising a mass of intermeshed glass or other vitreous fibers and a hardened binder adhering fibers to one another at points of contact, and wherein interstices among the fibers are filled by a clay-resite or equivalent composition, is provided. As a first step in producing such a board, the board 22 of FIG. 2 can be charged onto a conveyor 23 shown in FIG. 3, and suitably driven in the direction indicated by the arrows. The board 22 is advanced by the conveyor 23 under an inclined plate 24 of an impregnant reservoir 25. An impregnant composition is delivered through a pipe 26 to the reservoir 25, from which it overflows and runs down the plate 24 in a substantially uniform stream, and at a rate which depends upon the rate at which the composition is supplied through the pipe 26. The conveyor 23 is foraminous, so that vacuum applied through a line 27 to a box 28, which is disposed under the conveyor 23, and longitudinally aligned with the discharge edge of the plate 24, facilitates impregnation of the board 22 by the composition. A sliding damper (not illustrated) in the top of the box 28 is used to control suction through the board 22 to provide the required impregnation. A wet board is designated 29, and can be converted to a finished fibrous board product by drying, for example for from about one to eight hours at 300° F. to 500° F., depending upon board thickness, fiber diameter, amount of water, and decomposition characteristics of the binder.

Figure 4:
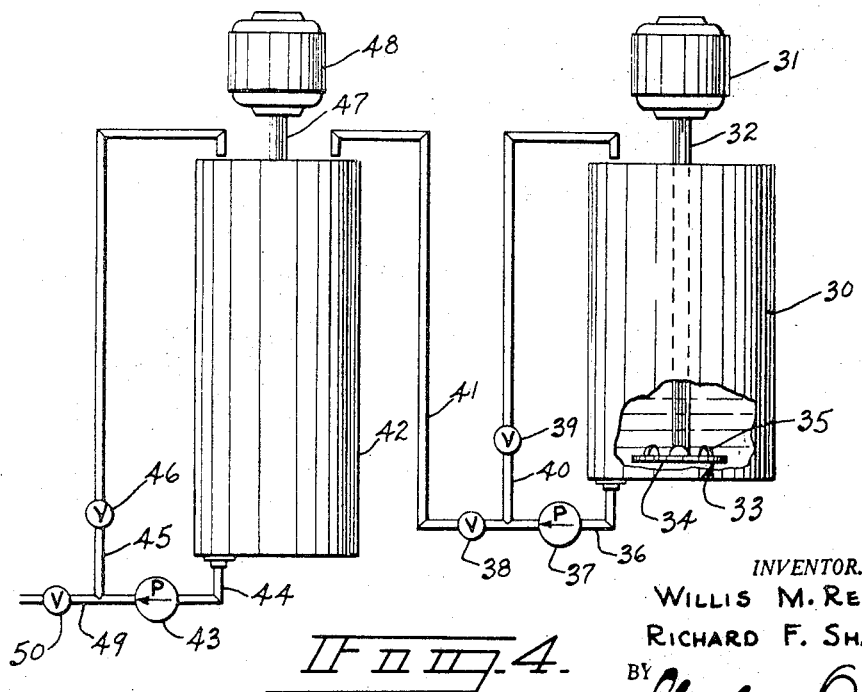
FIG. 4 is a diagrammatic view in elevation showing apparatus suitable for preparing a slurry for impregnation in the apparatus of FIG. 3.

A suitable impregnating composition can be prepared from a Clay A, which is subsequently identified in more detail, and a binder composition identical with Binder Composition No. 2 identified above in Table I except that the asbestine is omitted, and with sufficient water to provide a 20 percent solids content. A mixer 30 shown in FIG. 4 is charged with 14 gallons of water, 2½ gallons of Binder Composition No. 2, minus the asbestine, 100 pounds of Clay A and about ¾ pint of the dioctyl ester of sodium sulfosuccinic acid as a surface active agent. A motor 31 is thereafter energized to drive a shaft 32 and a shear-type mixing blade 33 carried thereby at about 800 revolutions per minute. The specific blade 33 is a generally flat plate 34 about 8 inches in diameter, with upwardly stamped projections 35 to cause agitation of the ingredients being mixed, although other known shear blades, suitably sized for the particular charge, can also be used. The principal comminuting action is as a consequence of shear caused by rotation of the blade 33 in the thick, viscous slurry. After approximately five minutes of agitation at 800 revolutions per minute, the motor 31 is accelerated to provide a rotation of about 1200 revolutions per minute for an additional 15 minutes. Longer mixing can be used without detriment, but at least the indicated mixing should be carried out not only to assure uniformity of the dispersion, but also to break up any clay agglomerates. The mixer 30 is provided with a discharge line 36 through which the composition therein can be drawn by a pump 37. During the mixing, the pump 37 can operate with a valve 38 closed and a valve 39 open so that impregnating material is circulated through a line 40 back to the mixer 30. After mixing is complete the valve 38 can be opened and the valve 39 closed so that the thick, viscous slurry formed is pumped through a line 41 to a receiver 42. A pump 43 draws the slurry from the receiver 42 through a line 44, and delivers it through a line 45 and an open valve 46 for return to the receiver 42. In the receiver 42 the slurry from the mixer 30 is mixed with a 40 gallon discharge of water which has previously been added thereto, and a uniform dispersion is formed by a propeller-type agitator (not illustrated) on a shaft 47 driven by a motor 48. When mixing in the receiver 42 is complete, the impregnating composition therefrom can be delivered through a line 49 and a valve 50, which had previously been closed, but which is now open, and to the pipe 26 of the impregnating apparatus of FIG. 3. The composition specifically identified has a total solids content of about 18 percent, but it has been found that solids can vary from about 5 percent to about 60 percent. It is sometimes advantageous to add a conventional anti-foam agent and more of the surface active agent to the receiver 42 to prevent foaming and to assure uniformity of dispersion.

When fibrous board materials produced as described above using any of the binder compositions set forth in Tables I and II are impregnated with the clay impregnating composition described above and dried, it is found that the elevated temperature resistance of the board materials has been further increased by the impregnation. It has also been found that various clays can be substituted for the Clay A used in the impregnating composition described above and that, although the actual results may vary within relatively narrow limits, the indicated advantage is always obtained so long as the clay has the indicated properties hereinbefore set forth. Chemical and physical properties of Clay A and of other clays that have been found to be suitable for use in the impregnating composition are set forth in the following table:

| Chemical Analysis | Clay A | Clay B | Clay C | Clay D | Clay E | Clay F | Clay G | Clay H |
|---|---|---|---|---|---|---|---|---|
| Silica | 45.92 | 45.21 | 60.19 | 52.01 | 47.02 | 55.37 | 58.82 | 48.90 |
| Alumina | 37.02 | 37.75 | 26.47 | 30.34 | 37.87 | 29.32 | 26.99 | 16.60 |
| Iron | 1.16 | 1.01 | 0.89 | 0.97 | 0.80 | 1.15 | 1.01 | 1.00 |
| Titania | 1.05 | 1.97 | 1.72 | 1.64 | 0.21 | 1.85 | 1.40 | 1.20 |
| Lime | 0.32 | 0.03 | 0.31 | 0.35 | 0.08 | 0.24 | 0.32 | 6.13 |
| Magnesia | 0.26 | 0.12 | 0.23 | 0.17 | 0.16 | 0.23 | 0.22 | 2.17 |
| Soda | 0.29 | 0.19 | 0.33 | 0.20 | 0.24 | 0.30 | 0.28 | .30 |
| Potash | 0.22 | 0.18 | 0.44 | 0.38 | 0.20 | 0.28 | 1.70 | .20 |
| Ignition | 13.75 | 13.65 | 9.64 | 13.85 | 13.49 | 11.32 | 9.23 | 23.50 |
| Particle Size Distribution, Percent: | | | | | | | | |
| 10 microns | 89.5 | 97.2 | 81.0 | 97.5 | 82. | 96.5 | 77.0 | 85 |
| 5 microns | 82.0 | 94.0 | 75.0 | 94.5 | 77. | 93.5 | 66.5 | 79 |
| 2 microns | 69.0 | 86.0 | 67.0 | 85.0 | 68.5 | 85.0 | 52.0 | 70 |
| 1 micron | 57.0 | 75.8 | 58.0 | 73.5 | 59.0 | 74.0 | 41.0 | 61 |
| 0.5 micron | 43.0 | 62.0 | 46.0 | 58.0 | 48.0 | 58.5 | 27.5 | 50 |
| 0.2 micron | 21.0 | 33.0 | 30.0 | 34.5 | 24.0 | 33.5 | 12.0 | 26 |
| Type | Plastic Georgia Kaolin | South Carolina Kaolin | Ball Clay Filler | Tennessee Ball Clay | Plastic Kaolin | Tennessee Ball Clay | Tennessee Ball Clay | Montmorillonite (bentonite) |

It should be noted that the foregoing clays fall into the general categories of ball clays, kaolins and montmorillonites. Clays of such types having the particle size distribution set forth above are preferred impregnant composition constituents, although, in general, any appropriately sized aluminum silicate clay is suitable.

bentonite was substituted for 1 part of the Clay A. The bentonite drastically improves green strength, and reduces elevated temperature shrinkage significantly. In addition, it enables the introduction of an increased proportion of clay into the board.

Preferred ranges of proportions of constituents in clay impregnating compositions and in clay impregnated fibrous boards are set forth in Table V, below:

TABLE V

| | Clay Impregnating Composition | | | | Impregnated Fibrous Board |
|---|---|---|---|---|---|
| | Water sufficient to give a total solids content of— | Phenolic resin or other binder (on dry solids organic basis disregarding clay) | Parts of total organic binder (on dry solids basis) per 100 parts of clay | Pinewood pitch extract [1] (on dry organic solids basis disregarding clay) | Percent of clay and phenolic binder resin on a dry solids basis, and based upon dry weight of impregnated board |
| Operable | 5 to 70 percent | 60 to 100 | 1 to 25 | Up to 40 percent | 20 to 75. |
| Preferred | 15 to 60 percent | 70 to 90 | 3 to 15 | 10 to 30 percent | 40 to 60. |
| Optimum | 20 to 40 percent | 75 to 85 | 5 to 10 | 15 to 25 percent | 45 to 55. |

[1] Preferably used only with thermosetting binders which are partial condensates with formaldehyde, and omitted from all other binder systems.

Examples of other clay impregnating compositions which have been produced in the manner described above with reference to FIG. 4 are set forth in Table IV, below:

TABLE IV.—COMPOSITION IN PARTS ON A DRY SOLIDS BASIS

| Composition No. | Water | Phenolic Resin A [1] | Pinewood Pitch Extract [1] | Starch | Corn Sirup | Clay A |
|---|---|---|---|---|---|---|
| 19 | Q.s. [2] | 4 | 1 | | | 100 |
| 20 | Q.s. | 4½ | ½ | | | 100 |
| 21 | Q.s. | 8 | 2 | | | 100 |
| 22 | Q.s. | 2 | ½ | | | 100 |
| 23 | Q.s. | 20 | 5 | | | 100 |
| 24 | Q.s. | 3 | 2 | | | 100 |
| 25 | Q.s. | | | 5 | | 100 |
| 26 | Q.s. | | | | 5 | 100 |
| 27 | Q.s. | 4 | 1 | 1 | | 100 |

[1] Previously identified.
[2] Sufficient water was used to provide a composition of 20 percent solids, based upon phenolic resin, pinewood pitch extract, starch, corn sirup, and clay.

When fibrous board materials produced as described above using any of the binder compositions set forth in Tables I and II are impregnated with the compositions set forth in Table IV, and dried, it is found that the elevated temperature resistance of the board materials has been further increased by the impregnation. The most resistant boards are made with binder compositions set forth in Table II, and impregnated with any of the identified clay impregnating compositions. Similar results can also be achieved using any one of clays B, C, D, E, F, G or H, identified in the foregoing table. Preferred clays have high green strength, a property shared by ball clays and bentonites. A particularly advantageous result has been achieved with a modification of Composition No. 19 where 1 part of be sufficiently low that solids are not filtered therefrom prior to the time the composition enters the board being impregnated.

The phenolic binder resin, starch and corn sirup serve the dual purpose in the impregnating composition of acting as a temporary binder for the clay and of carbonizing when the impregnated board is subjected to intermediate temperatures, between those at which the phenolic in its cured condition or the starch or corn sirup is effective per se as a binder, and those at which the clay itself is so effective. Carbonizing of the phenolic resin, which occurs roughly in the vicinity of 500° F., or of starch and corn sirup, which occurs at somewhat lower temperatures, forms what may be denominated a carbon bond; this carbon bond is effective at temperatures up to about 1000 or 1100° F. at which the clay itself becomes effective as a bonding material. As a consequence, the boards impregnated with phenolic starch or corn sirup and clay include some binder, other than that used to produce the boards themselves, which is effective from the time the board is initially impregnated (the cured phenolic resin per se, starch or corn sirup), at relatively low temperatures above the maximum at which the phenolic resin per se, starch or corn sirup is effective (carbon bonds), and at temperatures above the maximum at which the carbon bonds are effective (the clay itself). It has been found that other organic binder materials are similarly effective. For example, melamine formaldehyde binders, dicyandiamide formaldehyde binders, neoprene binders, butadiene-acrylonitrile copolymer binders, acrylic-, polyvinyl chloride-, polyvinyl alcohol- and polyvinyl acetate-latex binders, and urea formaldehyde binders exhibit a similar phenomenon, as do sugar and ordinary flour binders, and all have been used satisfactorily. The phenolic-, and phenolic-dicyandiamide-formaldehyde binder materials are preferred for all installations where fibrous boards are likely to be subjected to varying humidity conditions, because they are not subject to dimensional changes with ordinary variations in humidity. Urea formaldehyde, melamine formaldehyde and dicyandiamide formaldehyde binders are preferred for such installations over starch, flour, or corn sirup. However, starch, flour and corn sirup binder systems can also be used, and are highly advantageous for many applications where variations in humidity do not constitute a problem. Such inorganic binders as sodium silicate, colloidal silica and colloidal alumina are also suitable. Any binder system that is used should be employed in substantially the proportions set forth in Table V for the phenolic binder resin.

It will be noted that a single phenolic binder resin has heretofore been disclosed in connection with both the production of materials by the glass fiber board method and the impregnation of such boards. Such phenolic binder resin is an example of a preferred class of materials for this purpose, and for two specific reasons: (1) it is made from phenol, formaldehyde and dicyandiamide, and (2) it includes finely divided, and suspended barium sulfate formed as a consequence of the use of barium hydrate as a condensing agent and ultimate neutralization with sulfuric acid.

Phenolic resin binders for glass and other vitreous fiber products are subject to a phenomenon which has been denominated "punking." Such binders, when subjected to sufficiently high temperatures, are rather rapidly oxidized, with generation of heat, but without flame. This phenomenon, or "punking," consumes the binder, and without necessarily forming a carbon bond and, therefore, may completely eliminate the binder which is essential to a board structure made from glass or other vitreous fibers. Dicyandiamide, when used as discussed above in the production of a phenolic resin, is significantly effective at reducing the tendency of an ultimate cured binder toward punking. This is important both in the primary binder for the fibrous board product per se, and in the impregnant for the board product. As a consequence, such phenolic resinous materials constitute a preferred class of binders. However, similar binders can be produced by substituting melamine, urea, thiourea, or a mixture thereof for all or a part of the dicyandiamide, so that resinous materials which can be characterized as tripolymers of phenol, formaldehyde and dicyandiamide, melamine, urea, or thiourea, or mixtures thereof, constitute the preferred class of phenolic binder compositions.

Finely divided barium sulfate suspended in the phenolic resin which has been discussed above acts in some way which is not fully understood to facilitate the flow of binder compositions produced therefrom prior to the time that cure occurs to such an extent that flow no longer is possible. As a consequence of this phenomenon, asbestine or an equivalent therefor, or asbestine or an equivalent therefor and titania or an equivalent therefor, when distributed in a binder composition produced from such a resin, is more uniformly distributed over the glass fiber surfaces, and is, therefore, more effective at causing fiber devitrification when the board is subjected to heat. This effect has been observed experimentally by comparing two binder systems, both including finely divided asbestine as discussed above, and identical except that one was produced from a phenol-formaldehyde-dicyandiamide tripolymer which included the finely divided barium sulfate, while the other was produced from a similar tripolymer from which substantially all metal ions had been removed by treatment with a cation exchange resin. Although the binder composition which was free of barium sulfate caused a substantial increase in elevated temperature resistance, by comparison with a similar board made from a binder which was free of asbestine, a substantially greater increment of increased temperature resistance was imparted by the binder which included barium sulfate.

It has also been determined that the barium sulfate is effective by a physical phenomenon, as distinguished from a chemical phenomenon, and that the particle size of the barium sulfate, for it to be effective in this manner, must be from about 1 millimicron to about 1 micron. However, silica flour ground to the same size, and added to a phenolic resole composition, causes a corresponding increase in the effectiveness of the asbestine. It will be apparent, therefore, that any inert solid dispersed in a phenolic resole, and having a particle size with the indicated range, will cause substantially the same phenomenon to occur, and, therefore, improve the effectiveness of the asbestine or the like. The inert solid should be present to the extent of at least 2 percent, based upon the weight of the phenolic resin, on a dry solids basis, and can be present to the extent of as much as 10 percent, or even more, although more than about 5 percent thereof causes little if any increase in the effectiveness of the asbestine or the like. Barium sulfate is a preferred inorganic solid for use in binder systems according to the invention because it can be formed with facility in the manner set forth above in describing the preparation of Phenolic Resin A, while a relatively expensive comminution operation is required to provide a silica flour or other solid inorganic material that is equivalent thereto.

It has also been found that the properties of board products according to the invention can be varied, and the elevated temperature resistance thereof increased, by adding various materials thereto. As a specific example, exfoliated vermiculite has been added to the forming hood through which glass fibers were being projected toward a conveyor, along with a binder including asbestine, in the production of fibrous board products by the glass fiber board method. So far as could be determined, the water of hydration of the vermiculite was not a significant factor in affecting elevated temperature resistance, but the physical nature of the vermiculite itself was of some assistance. Asbestos, glass foam pellets and other materials, as desired, or required, can similarly be introduced into a forming hood to modify the characteristics of the fibrous board products.

It is known that both maximum devitrification temperature and rate of devitrification at various relatively high temperatures below such maximum are important properties of glasses from which fibers are to be produced. It is also known that glass composition has a marked affect upon both maximum devitrification temperature and rate of devitrification. Since, in a major respect, the instant invention is concerned with the use of asbestine or of an equivalent therefor, to cause relatively rapid devitrification of glass fibers, and at a comparatively low temperature, glasses which devitrify rapidly are preferable to glasses which devitrify slowly, or only at extremely high temperatures. However, the glass fiber composition set forth above represents a glass which is presently available commercially, in fibrous board form, and one which devitrifies comparatively slowly, and at a relatively high temperature under ordinary circumstances. The substantial improvement in elevated temperature resistance which has heretofore been discussed with reference to this particular glass, therefore, was achieved in spite of the use of a comparatively unfavorable glass.

Fibers produced from various minerals and slags have been known for many years, e.g. as mineral wool. Such fibers are ordinarily produced by a cupola operation, where alternate layers of minerals and of coke are charged to a cupola, the cupola is ignited, and streams of fused mineral which form within the cupola are periodically withdrawn and broken up either by a rotating disk or by high velocity steam blasts. Such processes produce relatively poor quality materials, with substantial amounts of solid glass particles intermixed with fibers. However, since the minerals are in a fused condition in the cupola for only a very short period of time, it is possible, and common practice, to employ mixtures which devitrify comparatively rapidly, and at extremely low temperatures, by comparison with conventional glass fibers. The instant invention is not concerned with boards which can be made from such fibers, but only with boards made by the glass fiber board process from fibers formed from streams of molten glass withdrawn from a melting tank which contains a substantial volume of the glass, insofar as the use of devitrifying agents and devitrification accelerators is concerned. In general, glass fibers have a composition within the following ranges: from about 50 percent to about 75 percent of silica, up to about 15 percent of boric oxide, from about 2 percent to about 25 percent of alkaline earth metal oxides, i.e., CaO, MgO, BaO and SrO, with the amount of CaO normally being at least 50 percent of the alkaline earth metal oxide content, from about 0 percent to about 15 percent of alkali metal oxides, particularly $Na_2O$, $K_2O$ or both, from about 2 percent to about 20 percent of alumina, from 0 percent to as much as about 10 percent of titania, as much as 1 percent of iron oxide, and from about 0 percent to about 3 percent of $F_2$. Traces of other glass-forming ingredients or impurities such as MnO, $ZrO_2$ and ZnO may be present. Preferred fiberizable glasses for use with devitrifying agents or with devitrifying agents and devitrification accelerators according to the invention comprise from about 54 to 60 percent of $SiO_2$, from about 4½ to 7 percent of $Al_2O_3$, from about 16 to 22 percent of CaO, from about 5 to 8 percent of MgO, and from about 8 to 12 percent of $Na_2O$. Also, glass fibers of the type here contemplated, do not devitrify substantially in ten minutes at their softening temperatures. However, using glass fibers which might heretofore have been considered marginal because of a relatively rapid devitrification rate or a relatively unfavorable maximum devitrification temperature is advantageous.

The advantages of clay impregnation of boards made by the glass fiber board process, as set forth herein, are equally achievable when the boards are made from any vitreous fibers, including those which might be considered mineral or slag fibers.

It should be emphasized that avoiding agglomerates of clay in producing an impregnating composition is critical. It has been found that any substantial agglomeration of the clay particles in such a composition makes it impossible to achieve satisfactory board impregnation. Instead of flowing into or through the board, the agglomerates filter from the composition on the surface of the boards, and the filtered agglomerates effectively block penetration. The use of a clay within the limits previously set forth with respect to particle size, and a mixing technique to eliminate agglomerates, therefore, are requisites for the production of an impregnated board. The use of a shear-type mixer in a concentrate of the final impregnating composition, as discussed above, constitutes a highly effective way in which to avoid agglomeration.

Various materials other than those specifically set forth above are frequently employed in binder composition used in producing boards by the glass fiber board process. For example, ammonium hydroxide is frequently used for pH control; various silanes and silicones are commonly used to improve coupling with binder, durability, or both; and emulsified mineral oils are frequently employed to improve the feel of the final products. Such materials can be used in boards according to the invention. It should also be noted that pinewood pitch extract was used in the several binder compositions disclosed above. Such material is reactive with phenol-formaldehyde partial condensation products, becoming a part of the ultimate binder composition. It is essentially, however, an extender for the phenolic materials. Substantially the same, or slightly superior results can be achieved by using a larger proportion of the phenolic or other binder constituent, so the use of the pinewood pitch extract or an equivalent therefor is not essential in accordance with the instant invention.

Boards according to the invention wherein the fibers carry a coating comprising asbestine or an equivalent therefor or asbestine or an equivalent therefor and titania or an equivalent therefor can also be impregnated with various cementitious materials for special applications. The asbestine or asbestine and titania, or the like, improves the elevated temperature properties of such impregnated materials, in much the same manner that has been described previously. Examples of suitable cementitious materials for such impregnation include magnesium oxy-sulfate cements, magnesium oxy-phosphate cements, magnesium oxy-chloride cements, gypsum, Portland cement and the like.

When boards produced by the glass fiber board process are to be impregnated with an aluminum silicate clay, as has been discussed above in detail, generally the same binder systems can be used as when clay impregnation is not contemplated, but usually in lesser amounts. Operable, preferred and optimum ranges of the indicated properties of fibrous boards for aluminum silicate clay impregnation are set forth in Table VI, below:

TABLE VI

| | Operable | Preferred | Optimum |
|---|---|---|---|
| Apparent density of fibrous board product in pounds per cubic foot, based upon weight of fibers therein. | 2 to 15 | 3 to 14 | 5 to 12. |
| Percent organic bonding solids | 5 to 15 | 7 to 12 | 8 to 11. |
| Ratio of parts of organic bonding solids to parts of asbestine or equivalent plus $TiO_2$ or equivalent.[1] | 2:3 to 3:2 | 3:4 to 5:4 | 4:5 to 6:5. |
| Ratio of parts of asbestine or equivalent to parts of $TiO_2$ or equivalent.[2] | 1:1 to 19:1 | 17:3 to 3:1 | 9:1 to 7:3. |

[1] When a devitrifying agent other than asbestine is used, it should equal in volume a weight of asbestine within the limits set forth.
[2] When a devitrification accelerator other than $TiO_2$ is used, it should equal in volume a weight of $TiO_2$ within the limits set forth.

Reference has heretofore been made to fibrous boards according to the invention as pipe insulation and the like. Such boards can be made by eliminating the oven 20 of FIG. 2, and, instead, carrying out the final cure of the binder in the mass 18 in a suitably shaped mold to produce the pipe insulation or the like formed product. The insulation or the like can be clay impregnated after the molding operation, and can include, dispersed in the binder, asbestine or an equivalent therefor or asbestine or an equivalent therefor and titania or an equivalent therefor introduced, for example, through the pipes 16 and the spray heads (not illustrated) as previously described. Other formed products can also be made in a similar manner, for example, hidden fire resistant shields for lighting fixtures, fire walls for marine, aircraft and automotive use, shaped insulation for storage tanks and structural building members, and the like.

The various board products which have heretofore been discussed in detail can also be produced in a manner different from those which have been discussed above. Specifically, two additional pipes (not illustrated) can be provided, extending through opposed walls of the forming hood 14 of FIG. 1, together with associated spray heads (not illustrated). A water slurry of asbestine or equivalent, titania or equivalent, clay, or mixtures of two or more, and with or without a phenolic or other binder can then be introduced into the forming hood through these nozzles, while a suitable binder system is introduced through the pipes 16 and associated nozzles. In this case, the aqueous slurry, glass fibers and binder are all co-deposited on the foraminous conveyor 15. If all of the indicated materials are incorporated in the aqueous slurry, Binder Composition No. 2, identified in Table I, above, but without the asbestine, can be introduced through the pipes 16. If the asbestine or equivalent is eliminated from the aqueous slurry, Binder Composition No. 2 is suitable, etc. Since finely divided solid particles in a binder composition reduce the effectiveness of that composition, the indicated method for producing board products according to the invention is preferred. By suitable manipulation all of the products that have previously been discussed can be produced by this modified method. The operable, preferred and optimum proportions are the same as with the previously described methods.

Flat, board-like products according to the invention can be used as fire-retarding acoustical materials and in many other ways, for example, as core materials for partitions, doors and cavity walls, as heat shields, as roof insulation and as form boards.

It will be apparent that various changes and modifications can be made from the specific details set forth herein without departing from the spirit and scope of the invention as defined in the appended claims.

What we claim is:
1. A fibrous board product comprising:
 (a) a mass of intermeshed glass fibers disposed in an open, non-woven arrangement, and,
 (b) a binder composition present as a coating on the surfaces of said fibers, said binder composition comprising:
  (1) a hardened synthetic resinous binder material bonding said glass fibers to one another at points of contact,
  (2) a devitrifying agent for said glass fibers selected from the group consisting of fibrous calcium and magnesium silicates dispersed in said binder composition and in surface contact with said glass fibers, and
  (3) a devitrification accelerator selected from the group consisting of the oxides, hydroxides, carbonates, and silicates of titanium, zirconium, chomium, aluminum and magnesium, and mixtures thereof, dispersed in said binder composition and in surface contact with said glass fibers, said devitrifying agent and devitrification accelerator being present in the binder composition in a ratio by weight ranging from about 1:1 to about 19:1, substantially all of said devitrifying agent and devitrification accelerator being finer than 200 mesh.

2. A fibrous board product as claimed in claim 1 wherein said devitrifying agent is asbestine and said devitrification accelerator is an oxide of titanium.
3. A fibrous board product as claimed in claim 1 wherein said devitrifying agent is wollastonite.
4. A fibrous product as claimed in claim 1 wherein said devitrifying agent is asbestos.
5. A fibrous board product as claimed in claim 1 wherein said devitrification accelerator is zirconium silicate.
6. A fibrous board product as claimed in claim 1 wherein said devitrifying agent and devitrification accelerator material are present in a ratio ranging from 9:1 to 7:3.
7. A fibrous board product comprising:
 (a) a mass of intermeshed glass fibers disposed in an open, non-woven arrangement, and,
 (b) a binder composition present as a coating covering at least about 40 percent of the surfaces of said fibers, said binder composition comprising:
  (1) a hardened synthetic resinous binder material bonding said glass fibers to one another at points of contact,
  (2) a devitrifying agent for said glass fibers selected from the group consisting of fibrous calcium and magnesium silicates dispersed in said binder composition and in surface contact with said glass fibers, and
  (3) a devitrification accelerator selected from the group consisting of the oxides, hydroxides, carbonates, and silicates of titanium, zirconium, chromium, aluminum and magnesium, and mixtures thereof, dispersed in said binder composition and in surface contact with said glass fibers, said devitrifying agent and devitrification accelerator being present in the binder composition in a ratio by weight ranging from about 1:1 to about 19:1, substantially all of said devitrifying agent and devitrification accelerator being finer than 200 mesh.

8. A fibrous board product as claimed in claim 7 wherein said devitrifying agent is asbestine and said devitrification accelerator is an oxide of titanium.
9. A fibrous board product as claimed in claim 7 wherein said devitrifying agent is wollastonite.
10. A fibrous board product as claimed in claim 7 wherein said devitrification accelerator is zirconium silicate.
11. A fibrous board product as claimed in claim 7 wherein said devitrifying agent and devitrification accelerator are present in a ratio ranging from 9:1 to 7:3.
12. A fibrous board product comprising:
 (a) a mass of intermeshed glass fibers disposed in an open, non-woven arrangement, and,
 (b) a binder composition present as a coating covering at least about 40 percent of the surfaces of said fibers, said binder composition comprising:
  (1) a hardened synthetic resinous binder material bonding said glass fibers to one another at points of contact,
  (2) a devitrifying agent selected from the group consisting of fibrous calcium and magnesium silicates for said glass fibers dispersed in said binder composition and in surface contact with said glass fibers, and
  (3) a devitrification accelerator selected from the group consisting of the oxides, hydroxides, carbonates, and silicates of titanium, zirconium, chromium, aluminum and magnesium, and mixtures thereof, dispersed in said binder composition and in surface contact with said glass fibers, said devitrifying agent and devitrification accelerator being present in the binder composition in a ratio by weight ranging from 1:1 to about 19:1, and (c) an aluminum silicate clay impregnant distributed in the interstices among said fibers, substantially all of said devitrifying agent, devitrification accelerator and clay impregnant being finer than 200 mesh.

13. A fibrous board product as claimed in claim 12 wherein the devitrifying agent is asbestine, the devitrification accelerator is an oxide of titanium, and the aluminum silicate clay impregnant includes at least about 1 percent of bentonite, and the remainder is selected from the group consisting of kaolins, montmorillonites and ball clays.

14. A fibrous board product as claimed in claim 12 wherein said devitrifying agent is asbestine.

15. A fibrous board product as claimed in claim 11 wherein said devitrification accelerator is zirconium silicate.

16. A fibrous board product comprising a mass of intermeshed glass fibers disposed in an open, non-woven arrangement with interstices thereamong, the apparent density of the board, based upon fibers alone, being from 2 to 15 pounds per cubic foot, from 5 to 15 percent, based upon the total weight of the board, of a hardened synthetic resinous binder material coating at least 40 percent of the surfaces of said fibers and bonding said fibers to one another at points of contact, a devitrifying agent for the glass of which said fibers are composed in surface contact with said fibers, the volume of said devitrifying agent being equal to the volume of from 2 parts of asbestine per 3 parts of said binder material to 3 parts of asbestine per 2 parts of said binder material, a devitrification accelerator selected from the group consisting of the oxides of Ti and the oxides, hydroxides, carbonates, and silicates of Fe, Zr, and Cr, and also in surface contact with said fibers, the volume of said devitrification accelerator being equal to the volume of from 1 part of titania per part of said devitrifying agent as asbestine to 19 parts of titania per part of said devitrifying agent as asbestine, and an aluminum silicate clay impregnant distributed in the interstices among said fibers, said clay impregnant being present in such proportions that there are from 1 to 25 parts of said binder material per 100 parts of said clay, substantially all of said devitrifying agent, devitrification accelerator and clay being finer than 200 mesh.

References Cited

UNITED STATES PATENTS

| 3,002,857 | 11/1961 | Stalego | 117—126 |
| 3,017,318 | 1/1962 | Labino et al. | 117—126 X |
| 3,232,782 | 2/1966 | Shannon | 117—126 X |

OTHER REFERENCES

Webster's 3rd New International Dictionary, G and C Merriam Co., 1961, p. 126.

ALEXANDER WYMAN, *Primary Examiner.*

R. H. CRISS, *Assistant Examiner.*